United States Patent
Elizov et al.

(10) Patent No.: US 10,228,743 B2
(45) Date of Patent: Mar. 12, 2019

(54) HIERARCHICAL PRIORITIZED CHARGING FOR BATTERY BACKUP UNITS ON COMPUTING DATA CENTERS

(71) Applicant: INTERNATIONAL BUSINESS MACHINES CORPORATION, Armonk, NY (US)

(72) Inventors: Ofir Elizov, Even Yehuda (IL); Mudi M. Fluman, Haifa (IL); Igor Nabutovsky, Beit-Shemesh (IL); Yehuda Shiran, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/895,031

(22) Filed: Feb. 13, 2018

(65) Prior Publication Data

US 2018/0217651 A1    Aug. 2, 2018

Related U.S. Application Data

(63) Continuation of application No. 15/691,952, filed on Aug. 31, 2017, now Pat. No. 9,946,318, which is a
(Continued)

(51) Int. Cl.
| | | |
|---|---|---|
| *G06F 1/30* | (2006.01) | |
| *H02J 7/00* | (2006.01) | |
| *H02J 9/06* | (2006.01) | |

(52) U.S. Cl.
CPC ............. *G06F 1/30* (2013.01); *H02J 7/0013* (2013.01); *H02J 9/061* (2013.01)

(58) Field of Classification Search
CPC ............ G06F 1/30; H02J 7/0013; H02J 9/061
(Continued)

(56) References Cited

U.S. PATENT DOCUMENTS

| | | | | |
|---|---|---|---|---|
| 5,903,131 A | * | 5/1999 | Sekine | G01R 19/16542 320/106 |
| 6,236,186 B1 | * | 5/2001 | Helton | H01M 10/42 320/106 |

(Continued)

FOREIGN PATENT DOCUMENTS

| | | |
|---|---|---|
| EP | 0594972 A2 | 5/1994 |
| WO | 2011156127 A2 | 12/2011 |

OTHER PUBLICATIONS

Emerson, "Data Center Transformation: The Impact of Emerging Power Architecture on Today's Data Centers," Emerson Network Power White Paper, 2016, p. 1-7.
(Continued)

*Primary Examiner* — M Baye Diao
(74) *Attorney, Agent, or Firm* — Erik K. Johnson; Reza Sarbakhsh

(57) ABSTRACT

A method for prioritized charging of battery backup units (BBUs) is provided. The method may include identifying critical system racks associated with computing data centers based on characteristics associated with the system racks on the computing data centers. The method may also include identifying critical system enclosures associated with the identified critical system racks based on system architectures associated with the computing data centers. The method may further include prioritizing the identified critical system enclosures based on parameters associated with the identified critical system enclosures. The method may also include identifying and ranking a plurality of critical BBUs associated with the identified and prioritized critical system enclosures based on prioritized charging rules associated with the plurality of critical BBUs. The method may further include charging the identified and ranked plurality of critical BBUs in an order based on the prioritized charging rules.

1 Claim, 5 Drawing Sheets

Related U.S. Application Data continuation of application No. 15/417,988, filed on Jan. 27, 2017.

(58) Field of Classification Search
USPC .................................................. 320/106
See application file for complete search history.

(56) References Cited

U.S. PATENT DOCUMENTS

| | | | |
|---|---|---|---|
| 6,498,460 B1* | 12/2002 | Atkinson | G06F 1/263 320/135 |
| 7,267,090 B2* | 9/2007 | Tamai | B60L 11/1868 123/179.3 |
| 8,860,363 B2* | 10/2014 | Ang | B60L 11/1816 320/104 |
| 9,098,278 B1 | 8/2015 | Nay | |
| 9,448,608 B1 | 9/2016 | Marr et al. | |
| 9,819,056 B2* | 11/2017 | Sebastian | H01M 10/4207 |
| 2006/0036880 A1 | 2/2006 | Maezawa | |
| 2009/0103341 A1* | 4/2009 | Lee | B60W 10/26 363/124 |
| 2009/0167217 A1* | 7/2009 | Soma | B60L 3/0046 318/376 |
| 2011/0006607 A1 | 1/2011 | Kwon et al. | |
| 2011/0072290 A1 | 3/2011 | Davis et al. | |
| 2011/0304211 A1 | 12/2011 | Peterson et al. | |
| 2012/0109555 A1 | 5/2012 | Humphrey et al. | |
| 2012/0306399 A1* | 12/2012 | Bazzani | H05B 33/086 315/210 |
| 2013/0099756 A1 | 4/2013 | Mohr et al. | |
| 2013/0181516 A1* | 7/2013 | Phan | H02J 7/14 307/10.7 |
| 2014/0159478 A1* | 6/2014 | Ang | B60L 1/00 307/9.1 |
| 2014/0203634 A1* | 7/2014 | Sugiyama | B60L 1/00 307/10.1 |
| 2015/0177808 A1 | 6/2015 | Sarti | |
| 2015/0222117 A1 | 8/2015 | Im | |
| 2015/0298631 A1* | 10/2015 | Belger | B60R 16/033 307/10.1 |

OTHER PUBLICATIONS

Mell et al., "The NIST Definition of Cloud Computing," National Institute of Standards and Technology, Sep. 2011, p. 1-3, Speciai Publication 800-145.

Elizov et al., Pending U.S. Appl. No. 15/417,988, filed Jan. 27, 2017, titled "Hierarchecal Prioritized Charging for Battery Backup Units on Computing Data Centers.", pp. 1-33.

Elizov et al., Pending U.S. Appl. No. 15/691,952, filed Aug. 31, 2017, titled "Hierarchial Prioritized Charging for Battery Backup Units on Computing Data Centers,", pp. 1-28.

Elizov et al., Pending U.S. Appl. No. 15/895,007, filed Feb. 13, 2018, titled "Hierarchial Prioritized Charging for Battery Backup Units on Computing Data Centers,", pp. 1-28.

IBM Appendix P, list of patents and patent application treated as related, filed herewith, 2 pages.

* cited by examiner

HIERARCHICAL PRIORITIZED CHARGING FOR BATTERY BACKUP UNITS ON COMPUTING DATA CENTERS

BACKGROUND

The present invention relates generally to the field of computing, and more specifically, to computer systems.

Generally, critical computer systems may be protected against unexpected power loss. For example, in case of unexpected power loss to critical computer systems, important data stored in the system cache may be written to non-volatile storage, a process called cache vaulting. Typically, an uninterruptible power supply (UPS) or battery backup unit (BBU) may be used to supply electric power to facilitate the cache vaulting process in case of the unexpected power loss. The BBU may differ from an auxiliary/emergency power system or standby generator in that the BBU may provide near-instantaneous protection from input power interruptions by supplying energy stored in batteries, supercapacitors, or flywheels. The battery runtime of a BBU may be relatively short (typically a few minutes) but sufficient enough to start a standby power source, perform cache vaulting, properly shut down the protected equipment of the critical computer system, or keep the system running in case the power loss is intermittent and the main power supply may return shortly. For example, multiple BBUs may be used to provide electric power to system enclosures associated with systems that may include racks of servers to perform cache vaulting to non-volatile storage, such as solid state drives (SSDs) and hard disk drives (HDDs).

SUMMARY

A method for prioritized charging of battery backup units (BBUs) is provided. The method may include identifying a plurality of critical system racks associated with at least one computing data center based on a plurality of characteristics associated with a plurality of system racks on the at least one computing data center. The method may also include identifying a plurality of critical system enclosures associated with the identified plurality of critical system racks based on a system architecture associated with the at least one computing data center. The method may further include prioritizing the identified plurality of critical system enclosures based on a plurality of parameters associated with the identified plurality of critical system enclosures. The method may also include identifying and ranking a plurality of critical BBUs associated with the identified and prioritized plurality of critical system enclosures based on prioritized charging rules associated with the plurality of critical BBUs. The method may further include charging the identified and ranked plurality of critical BBUs in an order based on the prioritized charging rules.

A computer system for prioritized charging of battery backup units (BBUs) is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include identifying a plurality of critical system racks associated with at least one computing data center based on a plurality of characteristics associated with a plurality of system racks on the at least one computing data center. The method may also include identifying a plurality of critical system enclosures associated with the identified plurality of critical system racks based on a system architecture associated with the at least one computing data center. The method may further include prioritizing the identified plurality of critical system enclosures based on a plurality of parameters associated with the identified plurality of critical system enclosures. The method may also include identifying and ranking a plurality of critical BBUs associated with the identified and prioritized plurality of critical system enclosures based on prioritized charging rules associated with the plurality of critical BBUs. The method may further include charging the identified and ranked plurality of critical BBUs in an order based on the prioritized charging rules.

A computer program product for prioritized charging of battery backup units (BBUs) is provided. The computer program product may include one or more computer-readable storage devices and program instructions stored on at least one of the one or more tangible storage devices, the program instructions executable by a processor. The computer program product may include program instructions to identify a plurality of critical system racks associated with at least one computing data center based on a plurality of characteristics associated with a plurality of system racks on the at least one computing data center. The computer program product may also include program instructions to identify a plurality of critical system enclosures associated with the identified plurality of critical system racks based on a system architecture associated with the at least one computing data center. The computer program product may further include program instructions to prioritize the identified plurality of critical system enclosures based on a plurality of parameters associated with the identified plurality of critical system enclosures. The computer program product may also include program instructions to identify and rank a plurality of critical BBUs associated with the identified and prioritized plurality of critical system enclosures based on prioritized charging rules associated with the plurality of critical BBUs. The computer program product may further include program instructions to charge the identified and ranked plurality of critical BBUs in an order based on the prioritized charging rules.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
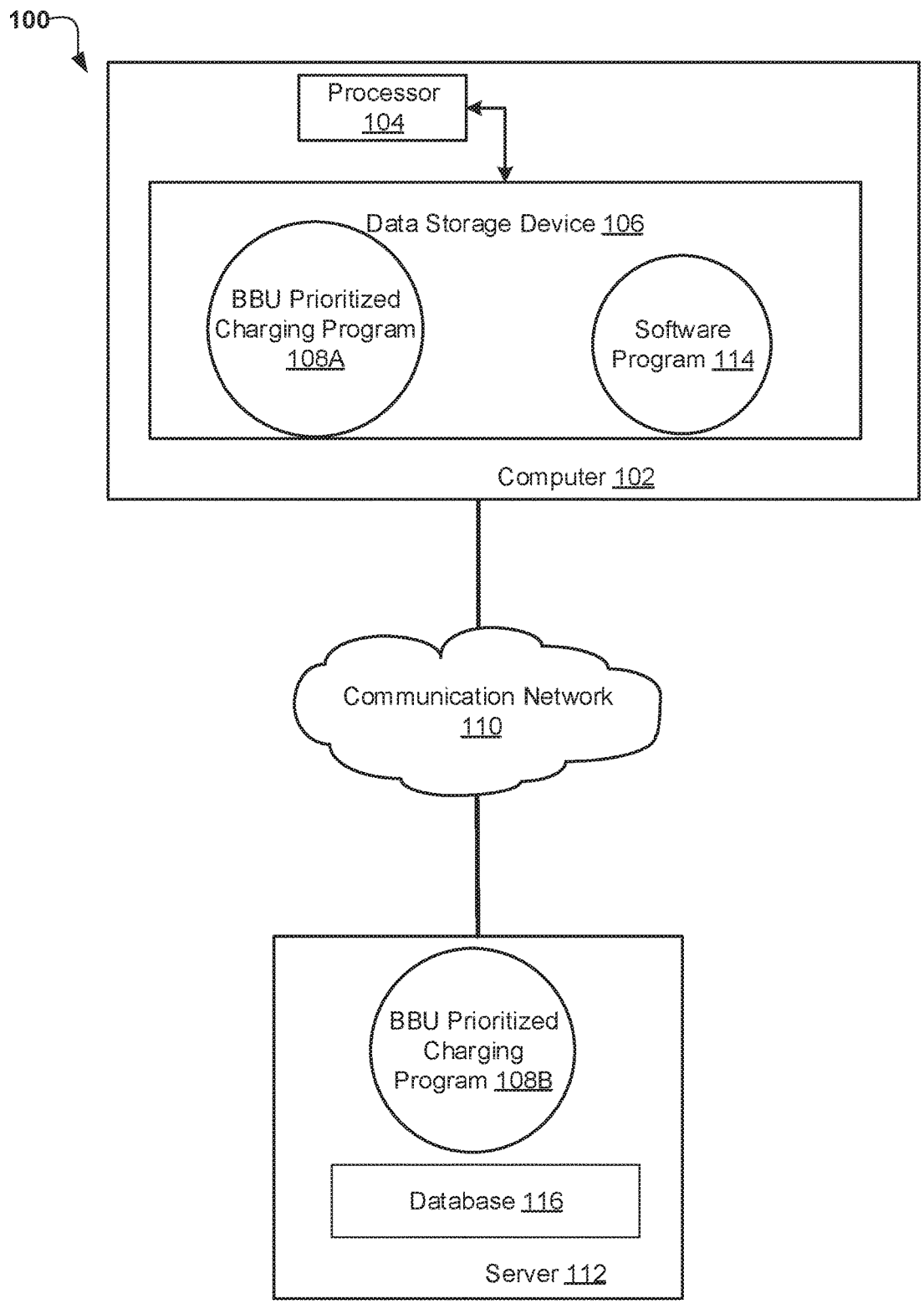
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly, to computer systems in a data center. The following described exemplary embodiments provide a system, method and program product for prioritized charging of backup battery units (BBUs) associated with computing data centers. Therefore, the present embodiment has the capacity to improve the technical field associated with computer electrical transmission by identifying critical BBUs on computing data centers that are discharged due to system power loss and prioritizing the charging of the critical BBUs based on characteristics associated with the computing data centers and the critical BBUs. Specifically, based on characteristics associated with the computing data centers, the present embodiment may determine critical system racks associated with the computing data centers, identify critical system enclosures associated with the critical system racks, identify the critical BBUs associated with the critical system enclosures, and select the critical BBUs to charge based on prioritization rules associated with the critical BBUs.

As previously described with respect to computer power systems, BBUs may be used to supply electric power to provide near-instantaneous protection from input power supply interruptions by supplying energy stored in batteries to power system enclosures. Furthermore, and as previously described, the battery runtime of BBUs may be relatively short but sufficient enough to start a standby power source, perform cache vaulting, properly shut down the protected equipment of the critical computer system, or keep the system running in case the power loss is intermittent and the main power supply may return shortly. However, following a power loss event of computing data centers, BBUs associated with the computing data centers may discharged to different levels, and need to be charged back up when power returns. During the charge-up period, computer systems associated with the computing data centers may potentially become disconnected due to a second or intermittent power loss event, and in turn may not provide the services needed for the computing data centers. For example, host computers associated with the computer systems may experience a loss of access period. Ideally, users may want all BBUs to charge back up simultaneously and at the fastest rate possible to protect the computer systems from further power loss events, but this is usually not the case. Typically, there are power budget constraints that prevent the systems from providing enough current to charge all BBUs at the same time. As such, it may be advantageous, among other things, to provide a system, method and program product for prioritized charging of BBUs associated with computing data centers. Specifically, the system, method and program product may identify critical BBUs on computing data centers that are discharged due to system power loss and prioritize charging the critical BBUs based on characteristics and system architectures associated with the computing data centers as well as prioritization rules based on the critical BBUs.

According to at least one implementation of the present embodiment, critical system racks associated with computing data centers may be identified based on characteristics associated with system racks on the computing data centers. Then, critical system enclosures associated with the identified critical system racks may be identified based on a system architecture associated with the computing data centers. Next, the identified critical system enclosures may be prioritized based on parameters associated with the identified critical system enclosures. Then, critical BBUs on the identified critical system enclosures may be determined and ranked based on prioritized charging rules associated with the critical BBUs. Then, the determined and ranked critical BBUs may be selected and charged in an order based on the prioritized charging rules.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for prioritized charging of battery backup units (BBUs).

According to at least one implementation, critical system racks associated with computing data centers may be identified based on characteristics associated with system racks on the computing data centers. Then, critical system enclosures associated with the identified critical system racks may be identified based on a system architecture associated with the computing data centers. Next, the identified critical system enclosures may be prioritized based on parameters associated with the identified critical system enclosures. Then, critical BBUs on the identified critical system enclosures may be identified and ranked based on prioritized charging rules associated with the critical BBUs. Then, the identified and ranked critical BBUs may be charged in an order based on the prioritized charging rules.

Referring now to FIG. 1, an exemplary networked computer environment 100 in accordance with one embodiment is depicted. The networked computer environment 100 may include a computer 102 with a processor 104 and a data storage device 106 that is enabled to run a battery backup unit (BBU) prioritized charging program 108A and a software program 114. The software program 114 may be an application program associated with computing data centers. The BBU prioritized charging program 108A may communicate with the software program 114. The networked computer environment 100 may also include a server 112 that is enabled to run a BBU prioritized charging program 108B and a communication network 110. The networked computer environment 100 may include a plurality of computers 102 and servers 112, only one of which is shown for illustrative brevity.

According to at least one implementation, the present embodiment may also include a database 116, which may be running on server 112. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may be one of many computers associated with a computing data center and may communicate with one or more server computers 112 via the communications network 110. The communications network 110 may include connections, such as wire, wireless communication links, or fiber optic cables. As will be discussed with reference to FIG. 3, server computer 112 may include internal components 800a and external components 900a, respectively, and client computer 102 may include internal components 800b and external components 900b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the BBU prioritized charging program 108A, 108B may interact with a database 116 that may be embedded in various storage devices, such as, but not limited to a mobile device 102, a networked server 112, or a cloud storage service.

According to the present embodiment, a program, such as a BBU prioritized charging program 108A and 108B may run on the client computer 102 or on the server computer 112 via a communications network 110. The BBU prioritized charging program 108A, 108B may identify and mark critical BBUs to charge on computing data centers in an order based on characteristics, parameters, and prioritization rules associated with the computing data centers. Specifically, a user using a computer, such as computer 102, may run a BBU prioritized charging program 108A, 108B, that interacts with a computing data center to identify critical BBUs on the computing data centers that are discharged due to system power loss, and to prioritize charging the critical BBUs in an order based on characteristics and system architectures associated with the computing data centers as well as prioritization rules based on the critical BBUs.

Figure 2:
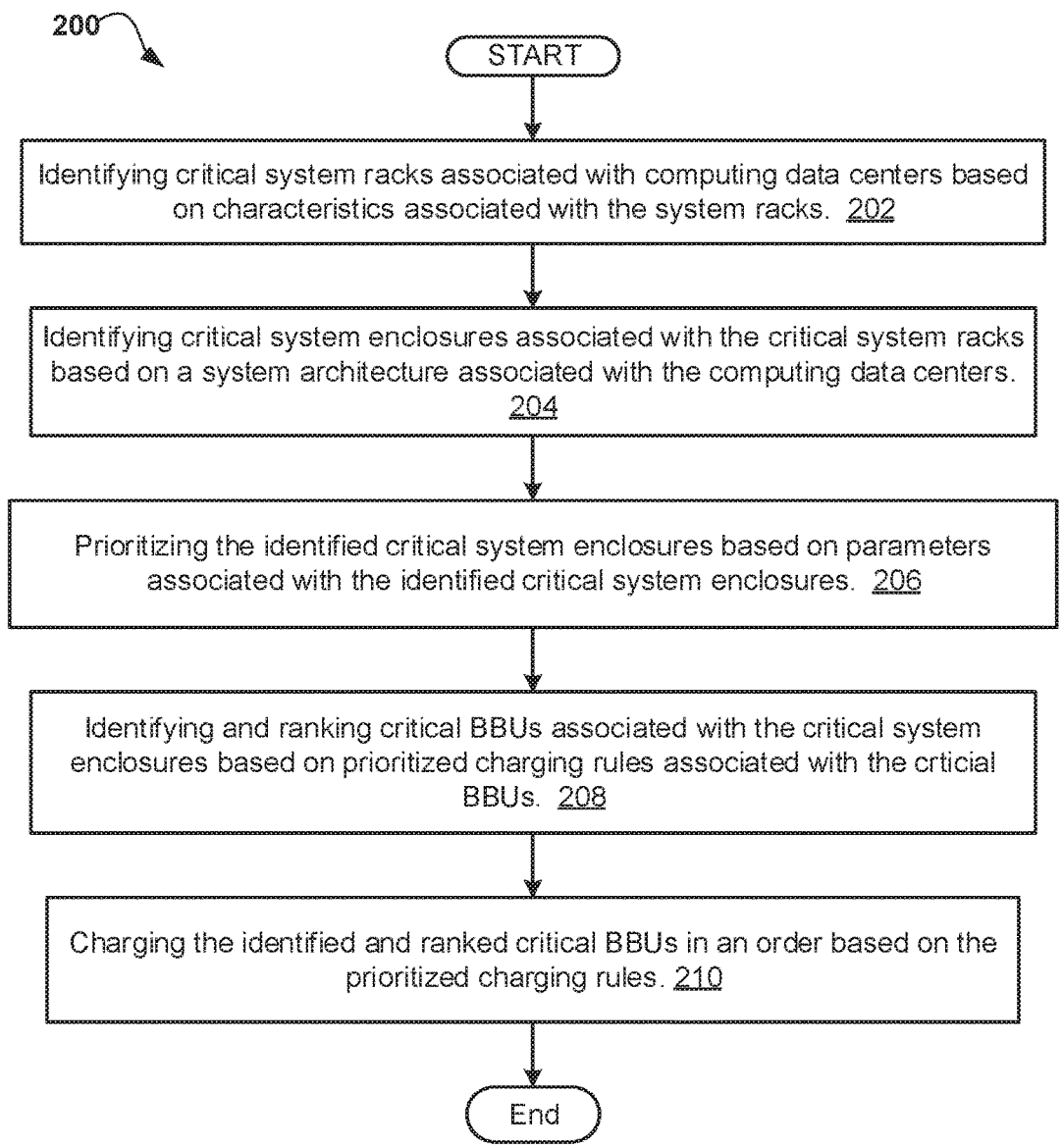
FIG. 2 is an operational flowchart illustrating the steps carried out by a program for prioritized charging of battery backup units (BBUs) according to one embodiment.

Referring now to FIG. 2, an operational flowchart 200 that illustrates the steps carried out by a program for prioritized charging of BBUs in accordance with one embodiment is depicted. At 202, the BBU prioritized charging program 108A, 108B (FIG. 1) may identify critical system racks associated with computing data centers based on characteristics associated with system racks on the computing data centers. Specifically, for example, the computing data centers may be hierarchical systems that include system racks, and the system racks may include system enclosures, and each system enclosure may include BBUs. Furthermore, following a system power outage or failure associated with the computing data centers, the BBU prioritized charging program 108A, 108B (FIG. 1) may determine that not all systems racks associated with the computing data centers may be deemed critical and need to be operational immediately. More specifically, the BBU prioritized charging program 108A, 108B (FIG. 1) may query the computing data centers to determine that some system racks can withstand a delay in charging back up without having a significant impact on the service/performance provided by the computing data center, and therefore, may be considered non-critical system racks. For example, the BBU prioritized charging program 108A, 108B (FIG. 1) may query each node associated with the computing data centers that may include a read request for data associated with the computing data centers, whereby the read request data may include the applications running on the system racks as well as the system architecture associated with the system racks. Specifically, according to one embodiment, a datacenter management computer performs the reads (for example, by pinging each node in the datacenter, or by referring to a table of stored values), and provides the read results to the BBU prioritized charging program 108A. BBU prioritized charging program 108A receives the read data, and continues with further processing based on the received data. In turn, based on the read data, the BBU prioritized charging program 108A, 108B (FIG. 1) may, for example, identify non-critical applications, such as mailing services and mirroring. Furthermore, according to one embodiment, the BBU prioritized charging program 108A, 108B (FIG. 1) may enable users to define the applications that may be deemed the non-critical applications. As such, the BBU prioritized charging program 108A, 108B (FIG. 1) may identify critical system racks associated with the computing data centers based on characteristics that may include the applications running on the system racks associated with the computing data centers, and the importance of the applications running on the system racks to users, which may be defined by the user and/or based on user usage history, userprofile data, and/or system requirements associated with the computing data centers that may be included in read request data.

Next, at 204, the BBU prioritized charging program 108A, 108B (FIG. 1) may identify critical system enclosures associated with the identified critical system racks based on a system architecture associated with the computing data centers. Specifically, the identified critical system racks may include system enclosures. For example, and as previously described in step 202, the identified system racks may include system enclosures which may further include stacks of computers and servers, whereby one or more of the computers and servers may be housed on a system enclosure associated with the system rack. Furthermore, the BBU prioritized charging program 108A, 108B (FIG. 1) may determine and rank a criticality level of each system enclosure based on the system architecture for the computing data centers. Specifically, and as previously described at step 202, the BBU prioritized charging program 108A, 108B (FIG. 1) may query each node associated with the computing data centers that may include a read request for data associated with the computing data centers, whereby the read data may include the applications running on, and the system architecture associated with, the system enclosures. For example, based on the query and read data, the BBU prioritized charging program 108A, 108B (FIG. 1) may determine that an identified critical system rack includes system enclosures that further includes different computers, storage servers, and switches. Furthermore, based on the system architecture associated with the computing data centers, the BBU prioritized charging program 108A, 108B (FIG. 1) may determine that there are two redundant switches on the system enclosures associated with the system rack. Therefore, the BBU prioritized charging program 108A, 108B (FIG. 1) may determine that at least one of the switches is critical, and may identify and mark the system enclosure associated with the at least one switch as critical. In another example, based on the system architecture associated with the computing data centers, the BBU prioritized charging program 108A, 108B (FIG. 1) may determine that the system architecture calls for at least three computer servers. Therefore, the BBU prioritized charging program 108A, 108B (FIG. 1) may identify and mark as critical, as well as rank, the system enclosures that include computer servers, whereby at least three of the computer servers associated with the identified system enclosures may be marked for prioritized charging.

Then, at 206, the BBU prioritized charging program 108A, 108B (FIG. 1) may rank/prioritize the identified critical system enclosures based on parameters associated with the identified critical system enclosures. As previously described at step 204, the BBU prioritized charging program 108A, 108B (FIG. 1) may identify critical system enclosures associated with the identified critical system racks based on the system architecture. For example, the BBU prioritized charging program 108A, 108B (FIG. 1) may determine that the system architecture calls for at least three computer servers, and therefore, may identify and mark as critical the system enclosures that include computer servers. Furthermore, the BBU prioritized charging program 108A, 108B (FIG. 1) may rank/prioritize the identified critical system enclosures that include the computer servers based on parameters such as CPU performance, dual in-line memory module (DIMM) size, state of charge of the BBUs and age of the BBUs associated with the system enclosures. For example, the BBU prioritized charging program 108A, 108B (FIG. 1) may identify and mark as critical one or more critical system enclosures with each system enclosure including a computer server. Thereafter, based on the system architecture calling for at least three computer servers, the BBU prioritized charging program 108A, 108B (FIG. 1) may rank/prioritize the one or more identified critical system enclosures based on the CPU performance, DIMM size, state of charge of the BBUs and age of the BBUs associated with each of the identified system enclosures. Specifically, the BBU prioritized charging program 108A, 108B (FIG. 1) may rank/prioritize an identified critical system enclosure with a better CPU performance and healthier BBUs, based on the state of charge.

Next, at 208, the BBU prioritized charging program 108A, 108B (FIG. 1) may identify and rank the critical BBUs associated with the identified critical system enclosures based on prioritized charging rules associated with the critical BBUs. Specifically, the BBU prioritized charging program 108A, 108B (FIG. 1) may query each node associated with the computing data centers that may include a read request for data associated with the computing data centers, whereby the read data may include information associated with each BBU. Thereafter, based on the query and the read information associated with the BBUs on the identified critical system enclosures, the BBU prioritized charging program 108A, 108B (FIG. 1) may use prioritized charging rules to rank the BBUs in order to prioritize charging the BBUs. For example, based on read information, the BBU prioritized charging program 108A, 108B (FIG. 1) may identify the critical system enclosures and may identify and rank the BBUs by determining the state of charge of each of the identified BBUs and the age of the identified BBUs. More specifically, the BBU prioritized charging program 108A, 108B (FIG. 1) may rank the identified BBUs based on a prioritized charging rule such as: (a) prioritize the BBU with the higher state of charge (%), and (b) if two or more of the BBUs are identical in the state of charge, prioritize the newer BBU. For example, the BBU prioritized charging program 108A, 108B (FIG. 1) may identify three BBUs—BBU A, BBU B, and BBU C—that are associated with identified critical system enclosures. Thereafter, the BBU prioritized charging program 108A, 108B (FIG. 1) may determine that BBU A has a higher state of charge than BBU B and BBU C. Therefore, the BBU prioritized charging program 108A, 108B (FIG. 1) may rank and prioritize charging BBU A first over BBU B and BBU C. Furthermore, the BBU prioritized charging program 108A, 108B (FIG. 1) may determine that BBU B and BBU C have the same state of charge, but that BBU B is newer than BBU C. Therefore, the BBU prioritized charging program 108A, 108B (FIG. 1) may rank and prioritize charging BBU B over BBU C.

Then, at 210, the BBU prioritized charging program 108A, 108B (FIG. 1) may charge the identified and ranked critical BBUs in an order based on the prioritized charging rules. Specifically, and as previously described at steps 202-208, the BBU prioritized charging program 108A, 108B (FIG. 1) may identify critical system racks associated with computing data centers, identify critical system enclosures associated with the identified critical system racks, may rank/prioritize the identified critical system enclosures based on parameters, and may identify and rank the critical BBUs associated with the identified critical system enclosures based on prioritized charging rules to first charge the prioritized critical BBUs in ranking order in response to a power outage event associated with a computing data center, and then charging the rest of the discharged BBUs.

It may be appreciated that FIG. 2 provides only an illustration of one implementation and does not imply any limitations with regard to how different embodiments may be implemented. Many modifications to the depicted environments may be made based on design and implementation requirements.

Figure 3:
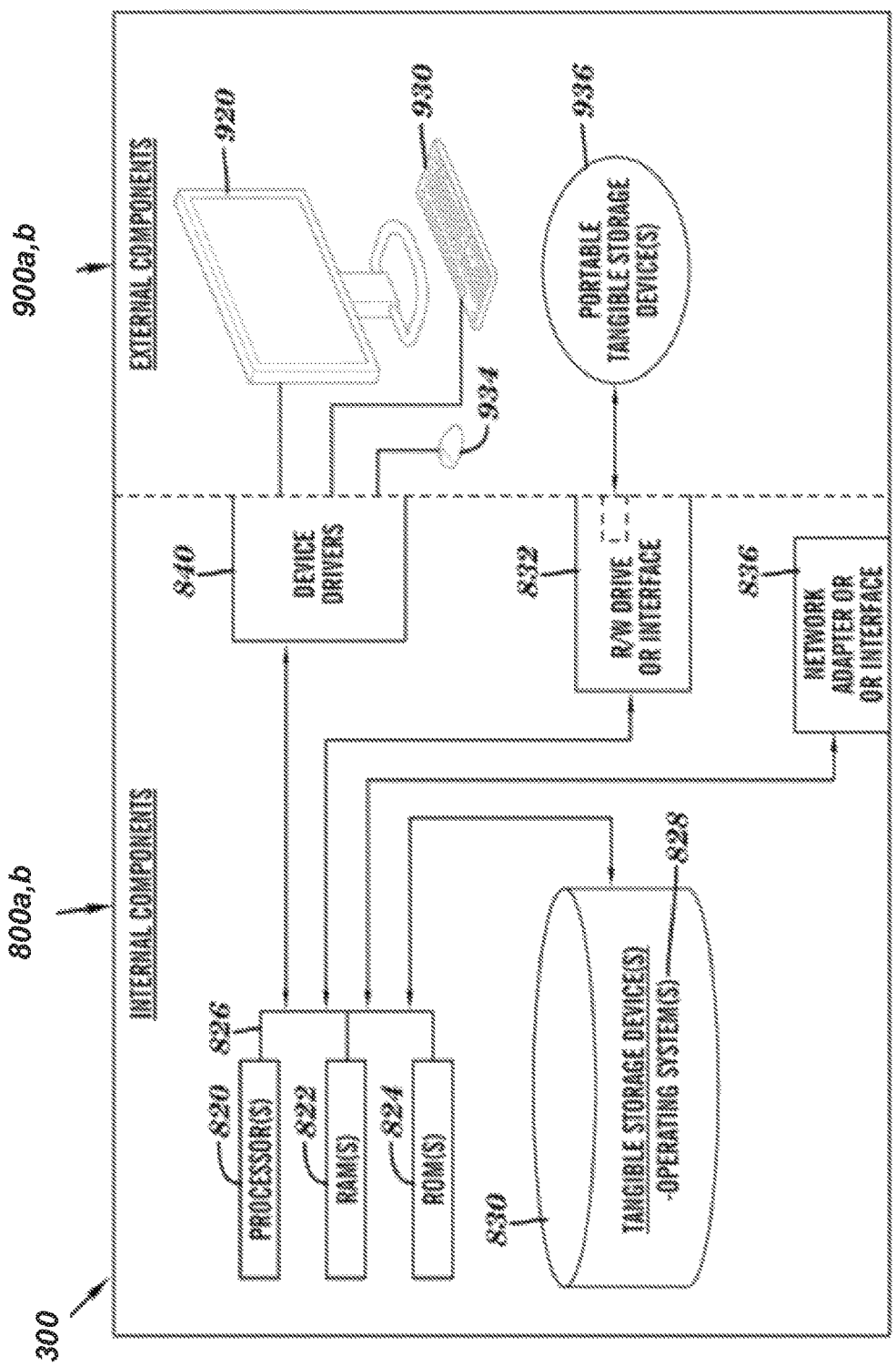
FIG. 3 is a block diagram of the system architecture of a program for prioritized charging of battery backup units (BBUs) according to one embodiment.

FIG. 3 is a block diagram 300 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 800 *a, b* and external components 900 *a, b* illustrated in FIG. 3. Each of the sets of internal components 800 *a, b* includes one or more processors 820, one or more computer-readable RAMs 822, and one or more computer-readable ROMs 824 on one or more buses 826, and one or more operating systems 828 and one or more computer-readable tangible storage devices 830. The one or more operating systems 828, the software program 114 (FIG. 1) and the BBU prioritized charging program 108A (FIG. 1) in client computer 102 (FIG. 1), and the BBU prioritized charging program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 *a, b*, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as a BBU prioritized charging program 108A and 108B (FIG. 1), can be stored on one or more of the respective portable computer-readable tangible storage devices 936, read via the respective R/W drive or interface 832, and loaded into the respective hard drive 830.

Each set of internal components 800 *a, b* also includes network adapters or interfaces 836 such as a TCP/IP adapter cards, wireless Wi-Fi interface cards, or 3G or 4G wireless interface cards or other wired or wireless communication links. The BBU prioritized charging program 108A (FIG. 1) and software program 114 (FIG. 1) in client computer 102 (FIG. 1), and the BBU prioritized charging program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the BBU prioritized charging program 108A (FIG. 1) and software program 114 (FIG. 1) in client computer 102 (FIG. 1) and the BBU prioritized charging program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900 *a, b* can include a computer display monitor 920, a keyboard 930, and a computer mouse 934. External components 900 *a, b* can also include touch screens, virtual keyboards, touch pads, pointing devices, and other human interface devices. Each of the sets of internal components 800 *a, b* also includes device drivers 840 to interface to computer display monitor 920, keyboard 930, and computer mouse 934. The device drivers 840, R/W drive or interface 832, and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
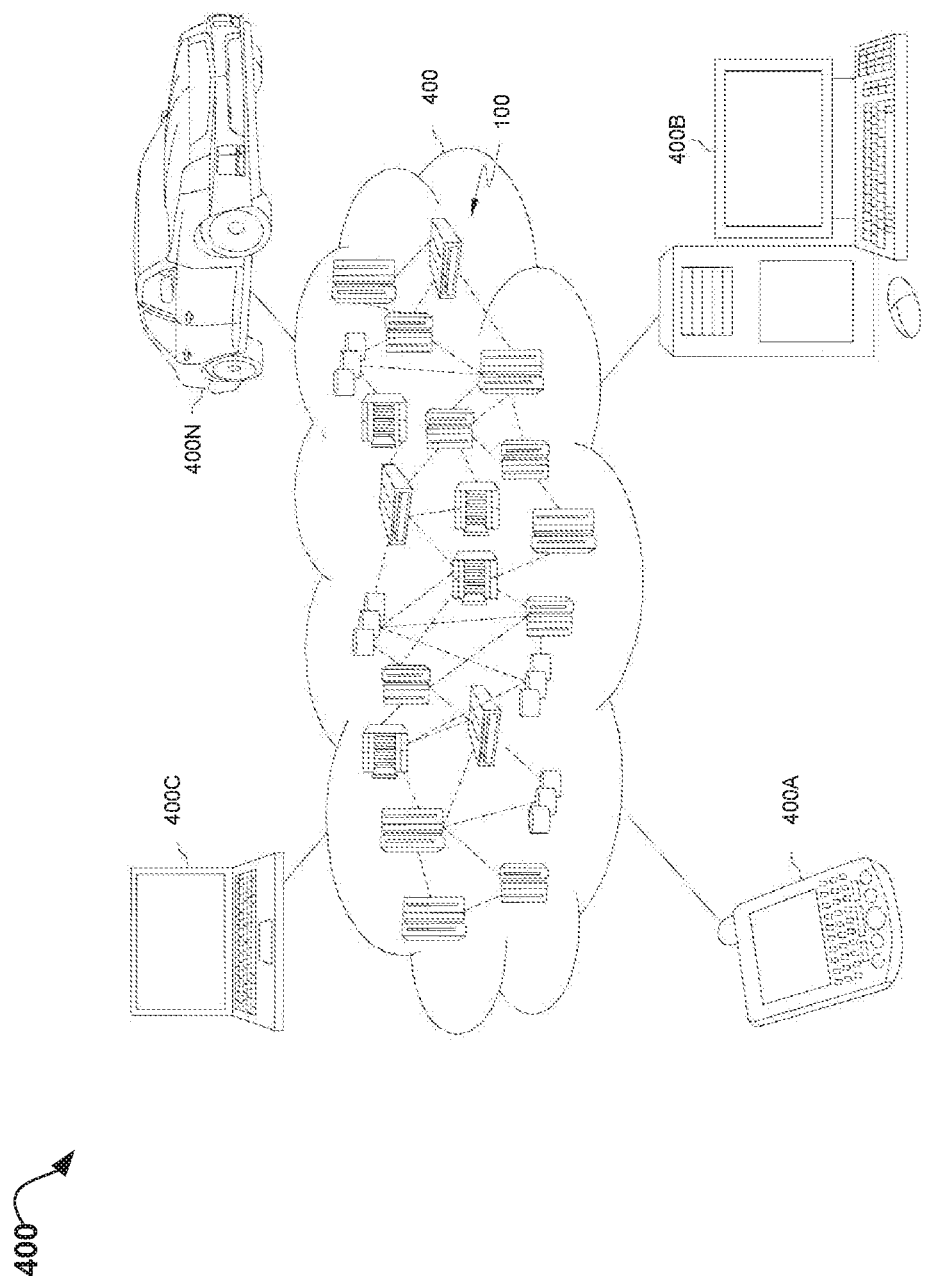
FIG. 4 is a block diagram of an illustrative cloud computing environment including the computer system depicted in FIG. 1, in accordance with an embodiment of the present disclosure.

Referring now to FIG. 4, illustrative cloud computing environment 400 is depicted. As shown, cloud computing environment 400 comprises one or more cloud computing nodes 100 with which local computing devices used by cloud consumers, such as, for example, personal digital assistant (PDA) or cellular telephone 400A, desktop computer 400B, laptop computer 400C, and/or automobile computer system 400N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 400A-N shown in FIG. 4 are intended to be illustrative only and that computing nodes 100 and cloud computing environment 400 can communicate with any type of computerized device over any type of network and/or network addressable connection (e.g., using a web browser).

Figure 5:
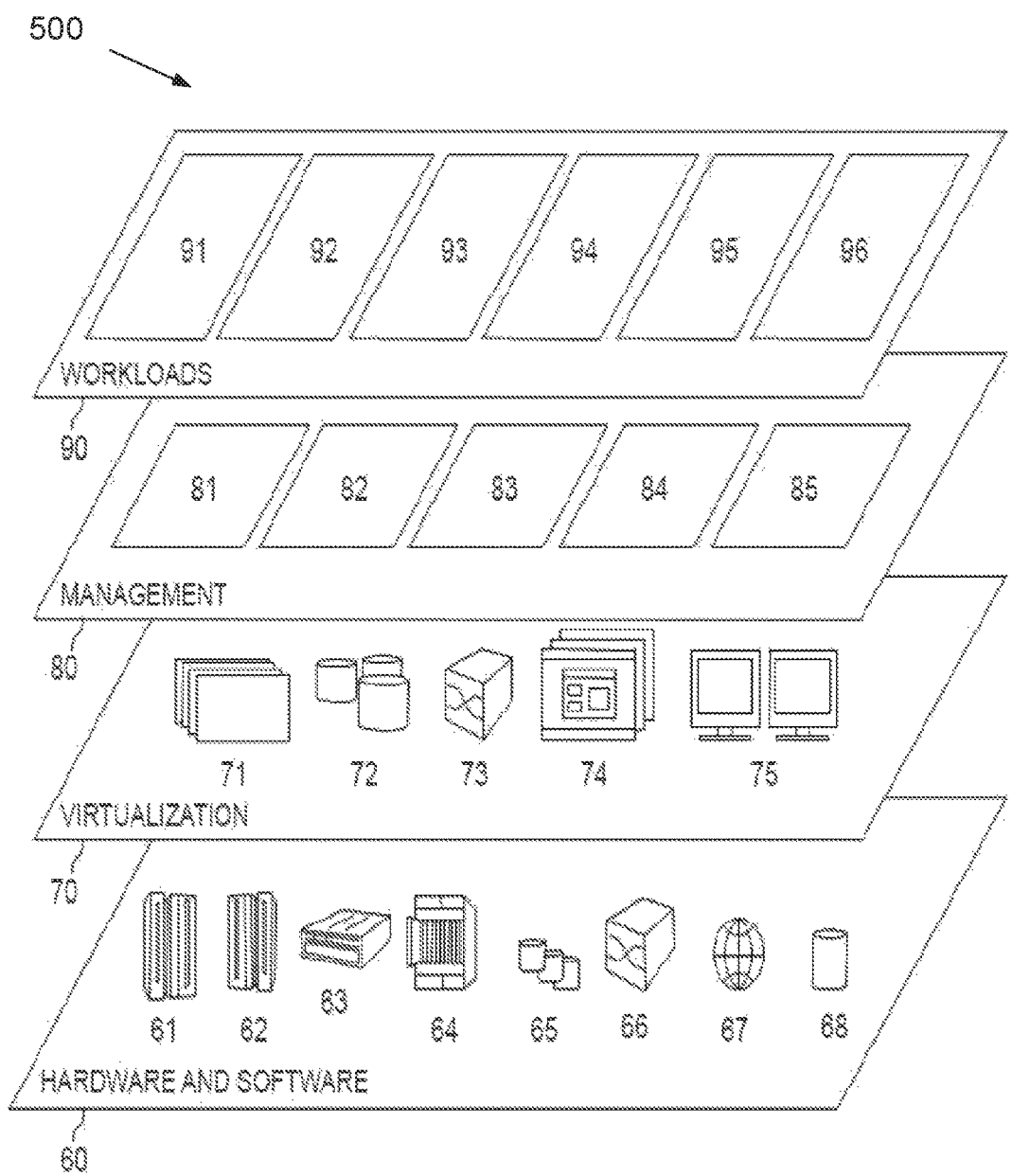
FIG. 5 is a block diagram of functional layers of the illustrative cloud computing environment of FIG. 4, in accordance with an embodiment of the present disclosure.

Referring now to FIG. 5, a set of functional abstraction layers 500 provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and BBU prioritized charging 96. A BBU prioritized charging program 108A, 108B (FIG. 1) may be offered "as a service in the cloud" (i.e., Software as a Service (SaaS)) for applications running on mobile devices 102 (FIG. 1) and may prioritize charging of battery backup units (BBUs).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for prioritized charging of battery backup units (BBUs), comprising:
one or more computer-readable tangible storage devices and program instructions stored on at least one of the one or more tangible storage devices, the program instructions executable by a processor, the program instructions comprising:
program instructions to identify a plurality of critical system racks associated with at least one computing data center based on a plurality of characteristics associated with a plurality of system racks on the at least one computing data center, wherein the at least one computing data center comprises a hierarchical computing system comprising the plurality of system racks, wherein the plurality of system racks includes a plurality of system enclosures, and wherein the plurality of system enclosures includes a plurality of BBUs;
program instructions to identify a plurality of critical system enclosures associated with the identified plurality of critical system racks based on a system architecture associated with the at least one computing data center;
program instructions to prioritize the identified plurality of critical system enclosures based on a plurality of parameters associated with the identified plurality of critical system enclosures, wherein prioritizing comprises ranking the plurality of critical system enclosures based on the plurality of parameters;
program instructions to identify and rank a plurality of critical BBUs associated with the identified and prioritized plurality of critical system enclosures based on prioritized charging rules associated with the plurality of critical BBUs, wherein identifying the plurality of critical BBUs comprises identifying the plurality of critical BBUs based on a state of charge associated with a plurality of BBUs on the plurality of critical system enclosures and based on a battery age associated with the plurality of BBUs;

wherein the prioritized charging rules comprises a first prioritized charging rule that includes prioritized charging of a first set of critical BBUs associated with the plurality of critical BBUs over a second set of critical BBUs associated with the plurality of critical BBUs based on a state of charge of the plurality of critical BBUs, wherein the first set of critical BBUs includes a higher state of charge than the second set of critical BBUs;

wherein the prioritized charging rules comprises a second prioritized charging rule that includes, in response to the plurality of critical BBUs associated with the first set of critical BBUs and the second set of critical BBUs having a same state of charge, prioritized charging of the first set of critical BBUs and the second set of critical BBUs based on a battery age associated with the plurality of critical BBUs; and program instructions to charge the identified and ranked plurality of critical BBUs in an order based on the prioritized charging rules, comprising charging first the first set of critical BBUs then charging the second set of critical BBUs based on the prioritized charging rules, wherein the first set of critical BBUs and the second set of critical BBUs includes the identified and ranked plurality of critical BBUs.

* * * * *